United States Patent [19]

Lemon

[11] 4,091,743
[45] May 30, 1978

[54] FLOOR STRUCTURE FOR REFRIGERATED VEHICLES

[75] Inventor: Lucien W. Lemon, Renton, Wash.
[73] Assignee: Paccar Inc., Bellevue, Wash.
[21] Appl. No.: 748,874
[22] Filed: Dec. 9, 1976
[51] Int. Cl.² ............................................. B61D 17/10
[52] U.S. Cl. ..................... 105/375; 52/588; 52/630; 105/422
[58] Field of Search ............... 105/355, 375, 422; 62/416; 52/377, 588, 593, 629, 630

[56] References Cited

U.S. PATENT DOCUMENTS

| | | | |
|---|---|---|---|
| 2,615,751 | 10/1952 | Black | 105/422 |
| 2,786,556 | 3/1957 | Constance, Jr. | 105/422 |
| 3,092,220 | 6/1963 | Black | 105/375 |
| 3,110,371 | 11/1963 | DeRidder et al. | 105/422 |
| 3,128,851 | 4/1964 | DeRidder et al. | 52/588 |
| 3,269,072 | 8/1966 | Black | 105/422 |
| 4,048,960 | 9/1977 | Barnidge et al. | 52/588 |

*Primary Examiner*—Drayton E. Hoffman
*Assistant Examiner*—Carl Rowold
*Attorney, Agent, or Firm*—Seed, Berry, Vernon & Baynham

[57] ABSTRACT

A plurality of modular units formed of ducts and horizontal load-supporting webs each form part of a ventilating floor structure with the ducts and webs being interconnected to adjacent modular units for forming a total floor. The ducts have upwardly diverging sidewalls for strength and a duct of one modular unit is provided with a bead that forms half of a joint to be slid within a downwardly opening recess forming the other half of the joint on an adjacent web. The recess is provided with a downwardly and laterally curving guide flange so that the bead can be rolled into the recess as the modular unit having the bead is rotated into position. The interconnected ducts and webs are underlayed with foam insulation which is carried up into each web for additional insulating thickness the joint is essentially waterproof from water passing into or through the ducts.

4 Claims, 4 Drawing Figures

FLOOR STRUCTURE FOR REFRIGERATED VEHICLES

BACKGROUND OF THE INVENTION

1. Field of the Invention

This invention relates to flooring for refrigerated containers such as trucks, trailers, and railcars.

2. Description of the Prior Art

Flooring for refrigerated containers has generally employed solid floorboards which do not allow adequate ventilation of the cargo and permit leakage down into the insulation below the boards. Typical flooring of this type is shown in U.S. Pat. No. 3,399,636. An improved flooring is shown in U.S. Pat. No. 3,092,220. In this latter patent flooring is made from aluminum extrusions which allow air ventilation beneath the cargo. These extrusions, however, are easily damaged from high pressure loads such as caused by the jitney wheels when loading the car and do not provide a watertight seal to prevent leakage through the joint between the extrusions.

SUMMARY OF THE INVENTION

It is an object of this invention to provide modular flooring units which, when combined, are of high strength and have a watertight joint.

It is another object of this invention to provide an inexpensive high strength flooring for refrigerated containers.

It is another object of this invention to provide modular flooring units which are easy to install and provide a waterproof, insulated, ventilated flooring for cargo containers such as trucks, trailers and railcars.

Basically, these objects are obtained by providing modular flooring sections each having upstanding ventilating ducts with upwardly diverging sidewalls interconnected by horizontal load-supporting webs. The modular flooring units are interconnected by a joint which is protected from above against water leakage and which is at the upper end of the duct so that water within the duct will not leak through the joint. In the preferred embodiment the joint is formed of a bead on one of the interconnecting modular units which can be rolled into a recess and braced between a guide flange and the edge of the recess for ease of assembly of the modular units and providing a high strength interconnection between the modular units. Insulation can be foamed in place beneath the ducts and up into the webs between the ducts for added insulation thickness. The ducts beneath the horizontal webs provide ventilating passages to allow air to circulate beneath the load. Since the flooring is waterproof it can be easily flushed down when cleaning the container without danger of leaking and damaging the insulation. Since the ducts are formed with angled sidewalls they offer higher strength than straight T sections and can withstand the highpoint loading of jitneys or front end loaders and the like which are driven into the container.

DETAILED DESCRIPTION OF THE PREFERRED EMBODIMENTS

Figure 1:
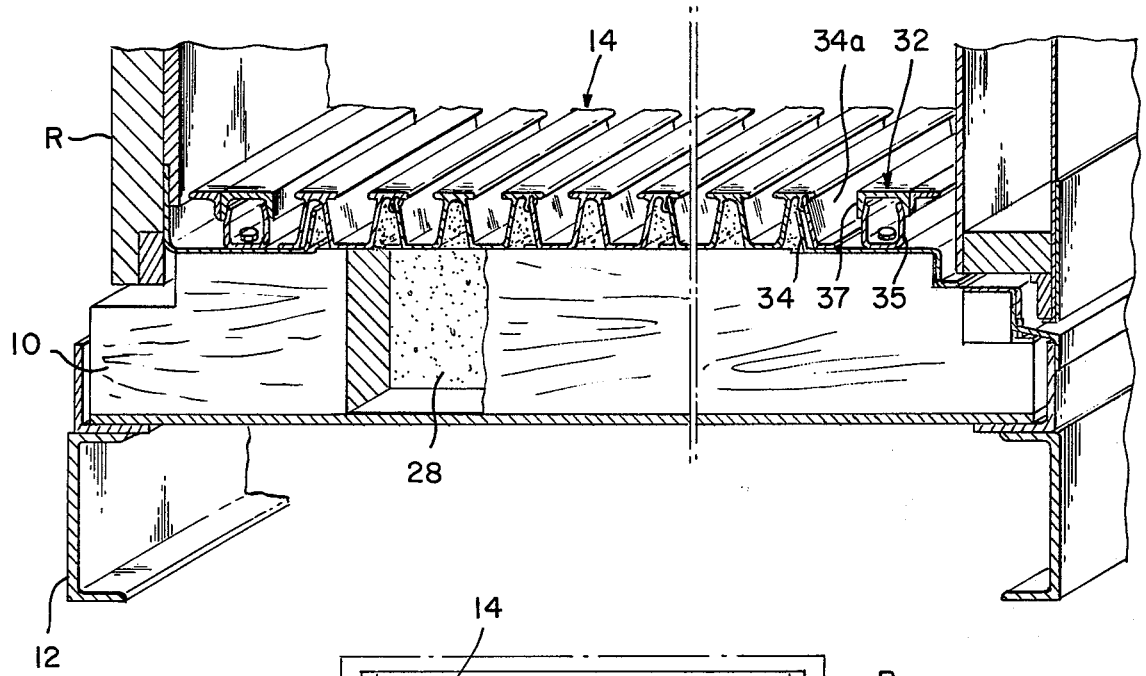
FIG. 1 is a fragmentary isometric in transverse section of a typical refrigerated container.

As best shown in FIG. 1 a refrigerated container such as a railcar R is provided with a plurality of longitudinally spaced, transverse stringers 10 seated on side sills 12. Fastened to the stringers and running lengthwise of the car are a plurality of modular flooring units 14 which are interconnected to make a unitary flooring in a manner to be described.

Figure 3:
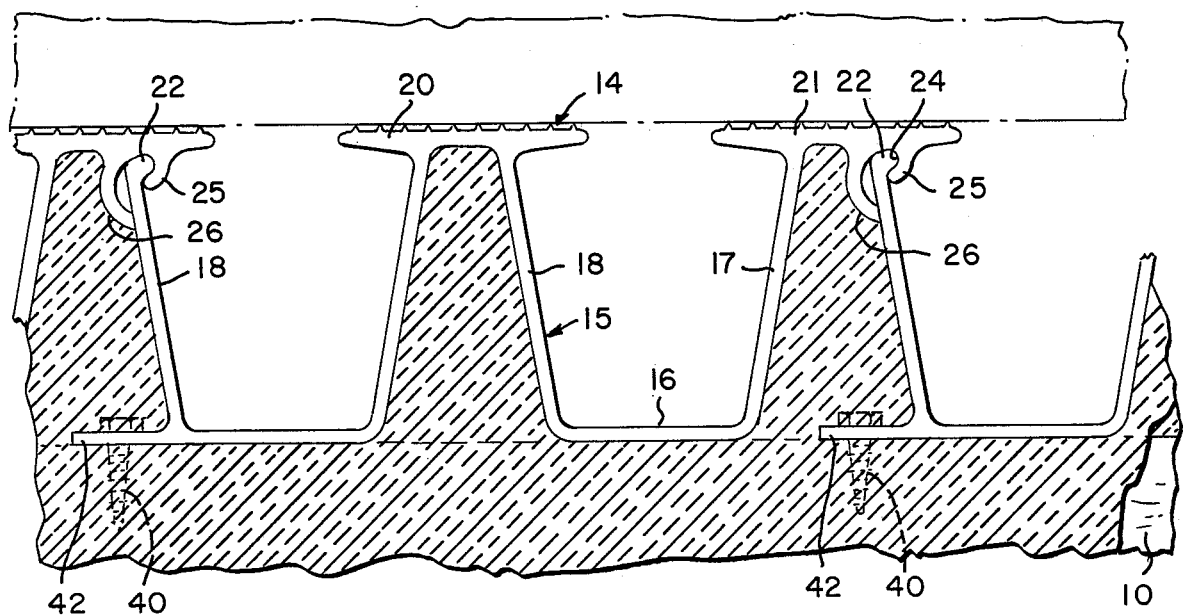
FIG. 3 is a fragmentary transverse section of the container flooring.
Figure 4:
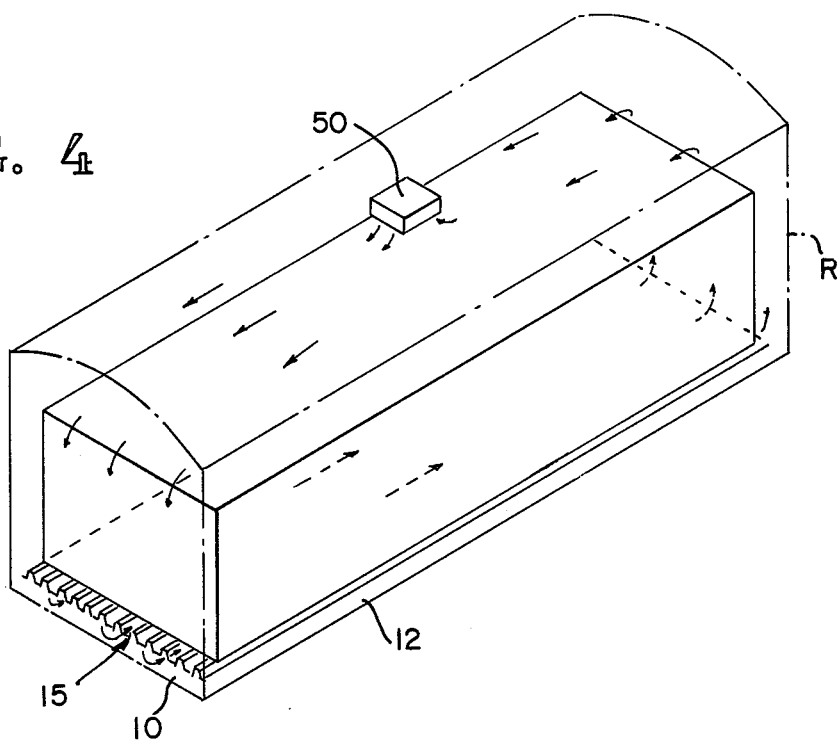
FIG. 4 is a schematic illustration of a typical refrigerated railcar embodying the container flooring.

Each modular flooring unit 14 includes a set of upstanding ducts 15 each with a bottom wall 16 and right-hand and left-hand upwardly diverging sidewalls 17 and 18, respectively. The adjacent sidewalls of the set of ducts are interconnected by an integral load-supporting web 20 and 21. The left-hand sidewall 18 of one of the ducts of each modular unit forms a joint-half having a lengthwise bead 22. The web 21 of each modular unit forms another joint-half which includes a recess 24 to receive a bead 22. The recess 24 is formed of a downwardly curved flange 25 and a downwardly and laterally curved guide flange 26. As best shown in FIG. 3, the flanges 25 and 26 rigidly support the sidewall 18 when the horizontal web 21 is under heavy loading. The shape of the sidewalls of the ducts with their inclination to the vertical provide very high-strength lateral support for carrying moving point loads such as a loaded jitney. The double web acts like a beam for added longitudinal support. Furthermore, the ducts provide ventilation passages from end-to-end in the car allowing the air from a refrigerating unit or fan 50 to circulate at all points up around the cargo carried in the car.

The modular units are interconnected by positioning a right-hand modular unit vertically with the bead 22 adjacent the guide flange 26. Then by rotating the entire modular unit, the bead is slid upwardly along the guide flange until the right-hand modular unit reaches the horizontal position shown in FIG. 3 and the bead is tightly wedged into the recess 24. The joint is substantially leakproof since it is located at the upper ends of the ducts and thus is not reached by water flushing through the ducts. Secondly, the web 21 overlies the joint so that water striking the upper surface of the webs will not leak down into the joint but rather will fall into the duct and be carried out of the car. The ducts are open at their opposite ends for removing the water.

Figure 2:
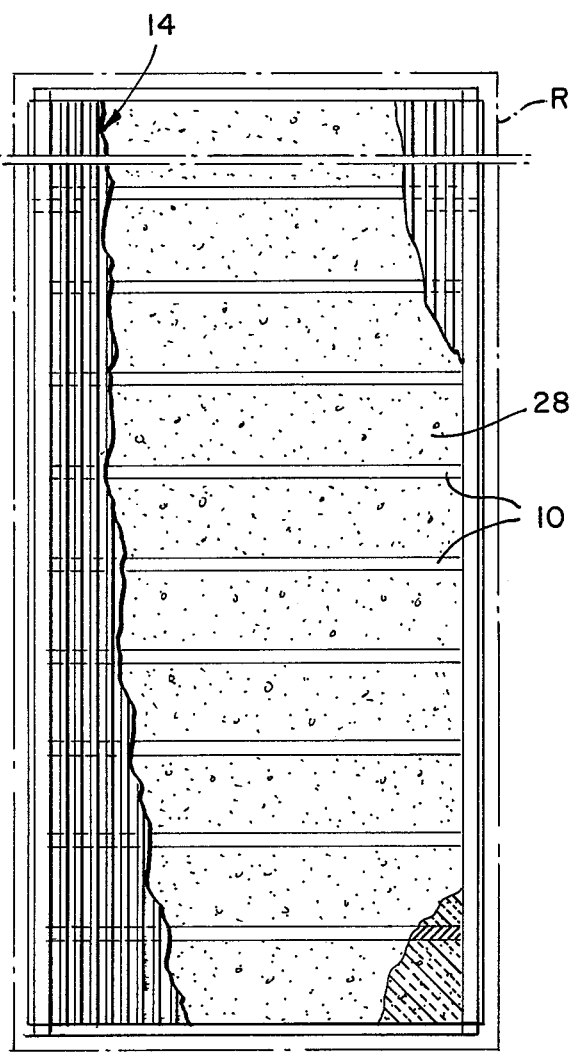
FIG. 2 is a plan of a container flooring with parts broken away for clarity.

As best shown in FIGS. 2 and 3, insulating foam 28 is foamed in place between the stringers 10 and foams up into the webs 20 and 21 between the sidewalls 17 and 18 of the ducts. This provides an additional thickness of insulation for retaining the cold in the container. The ends of the webs are sealed to prevent water leakage into the ends of the foam-filled webs.

The two modular units closest to the sidewalls of the railcar are joined to a transition unit 32 (FIG. 1) having a sidewall 34 formed of two welded plates with one plate 34a having a bead which fits within the recess 24 of the adjacent modular unit. A channel 35 is screwed into the stringers and is provided with a tightly fitting floor section 37. Lag bolts 40 pass through ears 42 formed from the bottom of the ducts and hold the modular units against the stringers.

While the preferred embodiments of the invention have been illustrated and described, it should be understood that variations will be apparent to one skilled in the art without departing from the principles herein. Accordingly, the invention is not to be limited to the specific embodiment illustrated in the drawing.

The embodiments of the invention in which a particular property or privilege is claimed are defined as follows:

1. A modular flooring for a refrigerated railcar, automotive truck or the like of the type having a closed body with front and rear ends, a ventilating apparatus for directing air down along at least one said end, and flooring support apparatus underlying the body, the improvement comprising:

elongated multiple interconnected modular flooring units fastened to said flooring support apparatus and each unit having a plurality of upwardly opening ducts and horizontal webs, the webs being interconnected by sidewalls of the ducts which diverge upwardly from bottom walls and run substantially the entire length of the body for providing ventilation passages below a load supported on the flooring units, interconnecting joints for connecting adjacent units, said interconnecting joints including a fixed web having a first horizontal load-carrying surface overlying and being fixed to a duct sidewall at an end of a flooring unit, said web having a downwardly opening recess terminating above the flooring support apparatus and formed by a curved downwardly and laterally outwardly extending guide flange and an inwardly curved end flange, the adjacent duct sidewall of a duct at the end of an adjacent modular flooring unit having an upper enlarged lip positioned within said recess for releasably joining the duct and the web of the adjacent units together and supporting the web of the adjacent duct as its sole point of contact with said first unit, at least one of said ducts of each modular flooring unit having an ear extending laterally from an outside lower end of a duct for fastening the ducts to said flooring support apparatus.

2. The flooring of claim 1, said flooring supporting apparatus including insulation extending up within said webs between the ducts.

3. A modular floor for a refrigerated vehicle comprising multiple floor sections each having first and second upwardly opening ducts each having upwardly and outwardly extending sidewalls joined by a flat bottom wall and interconnected by a first horizontal upper web, a second horizontal upper web extending laterally outwardly of a sidewall at the end of said second duct and terminating in a first coupling half, and said first duct having a second coupling half at the upper end of a sidewall of the opposite end of the duct interconnectable to the upper end of the first coupling half of an adjacent floor section whereby numerous floor sections can be fitted together to form a floor with the joints disposed at the upper ends of the floor out of the path of flushing water, said first coupling half having a downwardly opening recess concealed from above and formed by by the second upper web a downwardly and outwardly curved guide flange and an inwardly curved end flange, said second coupling half having an enlarged bead of a dimension greater than the gap between the end flange and guide flange in the plane of a duct sidewall so that the bead is removed from within an adjacent recess only by rotating the bead away from the recess whereby interconnected sections are tightly locked against relative vertical movement and whereby the first and second coupling halves form the only point of contact between adjacent floor sections.

4. The floor of claim 3, at least one duct of each set having a lower horizontal fastening ear adapted to secure the section to a support surface.

* * * * *